3,511,601
PROCESS FOR DENSIFYING RICE HULLS
Barrie H. Bieler and Ray S. Long, Walnut Creek, Calif., assignors to The Dow Chemical Company, Midland, Mich., a corporation of Delaware
No Drawing. Filed May 13, 1968, Ser. No. 728,749
Int. Cl. C01b 33/32
U.S. Cl. 23—110                              5 Claims

ABSTRACT OF THE DISCLOSURE

The present invention relates to a process for densifying rice hulls, that is, increasing the bulk density of the hulls. According to the process of this invention raw rice hulls are coated with an aqueous solution of an alkali metal salt or base, preferably sodium or potassium hydroxide, followed by incineration of the coated hulls, to provide a dense alkali metal silicate. The alkali metal silicate thus produced is contemplated as being useful as a raw material component in the manufacture of certain types of soda lime glass compositions.

---

In the processing of rice for human consumption the hulls must be removed before the rice can be utilized by the food industry. Common practice in disposing of the raw hulls is to burn them in an open pile in a field or in a simple metal incinerator. Burning the hulls in an open pile, however, creates an undesirable air pollution problem in that the incinerated hulls, which comprise primarily a low density silica ash with a weak physical structure, are easily crumbled and scattered by the wind. The incinerated hull ash is usually disposed of by plowing it under in swampy land, river banks or other terrain of marginal agricultural value. This poses a further problem, however, in that such a low density material occupies a huge volume and therefore requires a substantial amount of space in trucks or other vehicles required to transport it to the disposal site. Because of the air pollution and fine solids handling problem, therefore, it would be desirable to provide a method for increasing the bulk density of incinerated rice hulls or, alternatively, to find a new use for such hulls to avoid disposing of them as a waste product.

Accordingly, it is a principal object of the present invention to provide a process for densifying, that is, increasing the bulk density, of rice hulls when incinerated.

A secondary object of the invention is to provide a novel process for obtaining from rice hulls a dense alkali metal silicate useful as a batch feed component in the manufacture of certain soda lime glass compositions.

Other objects and many of the inherent advantages of the present invention will become apparent from reference to the following specification and appended claims.

Although we are not aware of any prior art relating to increasing the bulk density of rice hulls to obtain a dense alkali metal silicate according to the method of this invention, the prior art does teach boiling of the raw hulls in an aqueous solution of an alkali metal, such as sodium hydroxide, to (1) recover the silica value in the hulls to obtain an aqueous sodium silicate, as taught in U.S. Pat. No. 1,293,008 to Blardone, or (2) recover the cellulose value of the hulls to obtain a fibrous pulp useful in the manufacture of paper, as disclosed in U.S. Pat. No. 1,588,335 to J. F. Puttaert and H. F. J. Puttaert. In the aforementioned prior art processes the raw rice hulls are *digested* in an aqueous solution of an alkali metal salt or base, at ambient or near ambient temperatures, to obtain the desired silicate or pulp product; whereas in the process of the present invention, a dense alkali metal silicate is obtained by *coating* the hulls with a small amount of an aqueous solution of an alkali metal salt or base followed by incineration of the hulls at high temperatures and in the presence of oxygen to obtain a thermal oxidation of the hulls.

Broadly stated, densification of rice hulls according to the present process is achieved by coating raw rice hulls with an aqueous solution of an alkali metal salt or base, or mixtures thereof, preferably an aqueous solution of sodium or potassium hydroxide, and then incinerating the hulls at a temperature suitable to form a dense alkali metal silicate. An unexpected advantage of the present process is that the resulting densified product provides an alkali metal silicate which is contemplated to have utility as a batch feed component in the manufacture of certain types of soda lime glasses.

In obtaining a dense alkali metal silicate according to the present process, use is made of the fact that rice hulls contain a high percentage of silicon dioxide. It is known, for example, that the raw hulls contain about 20% $SiO_2$, with the remaining composition being primarily cellulose and minor amounts of other combustible materials. When the raw hulls are incinerated, however, to burn the combustible material, the remaining hull ash contains in excess of 95% $SiO_2$. The incinerated hull ash is a very low density product, that is, on the order of from about 0.01 to 0.02 gram/cc., which, as mentioned hereinbefore, presents an acute disposal problem because of the substantial volume occupied by such a low density material. In the practice of the present invention we have been able to increase the density of the incinerated hulls up to about 1.5 to 2.7 grams/cc., or, in other words a densifying factor of about 100.

The preferred alkali metal solutions for use in initially coating the hulls are water soluble bases and salts selected from the group consisting of sodium and potassium hydroxide and sodium or potassium carbonates, nitrates, oxalates, sulfates, phosphates, and the like. The hydroxides are particularly preferred because of their lower melting points. Sodium hydroxide is especially preferred since it has been observed that the rate of reaction of sodium hydroxide with the silica upon incineration of the coated hulls proceeds much more rapidly than the reaction of potassium hydroxide with silica at similar concentration levels of the hydroxide solution.

According to a preferred embodiment of this invention, a dense sodium silicate "glass" composition is obtained by coating raw rice hulls with an aqueous sodium hydroxide solution having a concentration of from about 5% to 50%, and preferably about 10% to 25% NaOH, by weight of the solution, and incinerating the coated hulls in an air atmosphere at a temperature of from about 700° C. to 1500° C. An operable ratio of coating solution to hulls is from about 0.2 to 1.0 ml. NaOH solution per 1 gram of hulls, with the preferred ratio being about 1 ml. of coating solution to 1 gram of hulls. As those skilled in the art will appreciate, the time required for the coated hulls to react to a sodium silicate "glass" will vary according to the concentration of NaOH in the coating solution and the temperature at which the coated hulls are heated. With regard to the time factor in the practice of the present process, we have been able to obtain a suitably dense sodium silicate "glass" in from about 2 seconds to about 10 minutes by heating the coated hulls at a temperature of from about 900° C. to 1500° C.

As mentioned hereinbefore, it is contemplated that the dense alkali metal silicate compositions of this invention would have utility as a batch feed component in the manufacture of conventional soda lime glass compositions. In this regard, since there is some color formation in the alkali metal silicate compositions obtained according to the present process, it is contemplated that these compositions would be particularly useful in the manufacture of soda lime glasses of the colored variety, such as beer bottles, wine bottles, and the like.

For the alkali metal hydroxide solution of this invention, it is preferred to use a commercially available 50% NaOH solution, which may be diluted according to standard procedure to the appropriate concentration desired. Electrolytic cell effluent NaOH solutions, as obtained from the electrolysis of salt brines (i.e. NaCl solutions) are also contemplated to be operable for coating rice hulls to obtain an alkali metal silicate according to the practice of this invention. For such alkali metal silicates to be suitable as batch feed components in the manufacture of glass, however, the concentration of NaCl in the coating solution should not be higher than about 2% by weight of the NaOH in solution, since higher concentrations of chloride are known to have a corrosive effect on the metal in glass blowing molds.

The following examples serve to illustrate the practice of this invention, it being understood that these examples are not to be construed in a limitative sense.

EXAMPLE I

In this example twelve 1 gram samples of raw rice hulls were each coated with 1 ml. of an aqueous solution of NaOH. As noted in Table I, below, the concentration of the NaOH coating solution and the temperature at which the sample was incinerated was varied in each instance. The general procedure was as follows.

The sample was placed in a small glass or plastic beaker and the NaOH solution was added, with stirring, until the hulls were thoroughly and evenly coated. Small portions of each sample were placed, in succession, in a conventional platinum strip furnace, which was open to the air. Each sample of coated hulls was then heated to a temperature between about 900° C. and 1500° C. and held at this temperature until the hull mass had formed into a dense sodium silicate "glass." The desired reaction temperature for each sample was maintained by checking the furnace temperature in each instance with an optical pyrometer. The time required for each hull sample to react to a "glass" composition was noted and recorded. A bulk density determination of several of the samples (as noted in Table I) was made using a conventional pycnometer according to known procedures. The results are set out in Table I below.

TABLE I

| Sample No. | Conc. of NaOH Soln (wt. percent) | Reaction Temp. (° C.) | Bulk density of sodium silicate glass (grams/cc.) | Time required to form sodium silicate glass |
|---|---|---|---|---|
| 1 | 50.0 | 900 | 2.6 | 10–15 min. |
| 2 | 50.0 | 1200 | | 7–15 sec. |
| 3 | 50.0 | 1500 | | 2–3 sec. |
| 4 | 25.0 | 900 | 2.7 | 7–10 min. |
| 5 | 25.0 | 1300 | | 10–12 sec. |
| 6 | 25.0 | 1450 | | 3–5 sec. |
| 7 | 10.0 | 900 | 1.9 | 7–10 min. |
| 8 | 10.0 | 1200 | | 15 sec. |
| 9 | 10.0 | 1500 | | 6 sec. |
| 10 | 6.25 | 1200 | 1.5 | 90 sec. |
| 11 | 6.25 | 1300 | | 30 sec. |
| 12 | 6.25 | 1500 | | 10 sec. |

EXAMPLE II

In this example 95 grams of a sodium silicate composition having the approximate composition $Na_2O \cdot 2SiO_2$, was prepared by incinerating a batch of about 310 grams of raw rice hulls which had been coated with about 310 ml. of an aqueous solution of sodium hydroxide having a concentration of about 10% NaOH by weight of the solution. The general procedure was as follows.

The entire batch of 310 grams of hulls was placed in a suitable container and the NaOH solution was added, with stirring, until the hulls were thoroughly and evenly wetted. The entire rice hull mass was then divided into increments of about 5 grams each. Each 5-gram increment of dampened hulls was then introduced, one increment at a time, into a 250 ml. platinum dish, where each increment was incinerated at a temperature of from about 1000° C. to 1100° C. by enclosing the dish in a gas-fired pot furnace. Sufficient time was allowed between addition of each 5-gram increment to allow the previously added increment to form a sodium silicate "glass" composition. Under the foregoing conditions the time required for each sample increment to form a "glass" composition was observed to be from about 5 minutes to 10 minutes. The substantially longer period of time required under the foregoing conditions to form a sodium silicate "glass," as compared to the reaction time required under the conditions of Example I, is believed to be due chiefly to a lack of oxygen in the furnace atmosphere and to concentration of the oxidation products of natural gas, i.e. water vapor, carbon dioxide and carobn monoxide.

For the remaining 155 g. of hulls, the coated hulls were incinerated in 5 g. increments in the same manner and under the same conditions as described above, except that a flow of fresh air (i.e. oxygen in fresh air) was blown onto each hull mass during incineration. During incineration each hull increment was observed to glow brightly until combustion was complete (2 to 3 minutes) after which time the flow of fresh air was observed to cool the surface of the sodium silicate "glass" composition thus formed.

From the data of Examples I and II it will be readily apparent to those familiar with the science of thermal chemical reactions that the incineration of NaOH-coated rice hulls to obtain a sodium silicate "glass" composition can be controlled in two ways: (1) by regulating the amount and rate of flow of oxygen over the hulls during incineration or (2) by sustaining a suitable temperature in the reacting medium by insulating the hulls from heat loss during incineration and by providing added heat through combustion of a fuel, such as natural gas, fuel oil, or the like.

The foregoing discussion and examples are intended to illustrate the practice of this invention. Other embodiments considered to be within the scope of the invention will be readily apparent to those skilled in the art.

What is claimed is:

1. A process for densifying rice hulls to obtain a dense alkali metal silicate, which comprises:

coating raw rice hulls with an aqueous solution of an alkali metal compound selected from the group consisting of an alkali metal hydroxide, an alkali metal salt, and mixtures thereof, wherein the ratio of coating solution to hulls is about 0.2 to 1 ml. of solution per 1 gram of hulls, and wherein the concentration of alkali metal solute in said solution is from about 5% to 50% by weight of the solution;

heating the coated hulls in an air atmosphere at a temperature of from about 700° C. to 1500° C. for a period of from about 2 seconds to 10 minutes to thereby incinerate and densify said hulls; and recovering an alkali metal silicate composition having a bulk density of from about 1.5 to 2.7 grams/cc.

2. The process of claim 1 wherein the coating solution is an aqueous solution of an alkali metal hydroxide selected from the group consisting of sodium hydroxide and potassium hydroxide, wherein the concentration of alkali metal solute in said solution is from about 10% to 25% by weight of the solution.

3. The process of claim 1 wherein the coating solution is an aqueous solution of sodium hydroxide having a concentration of about 10% sodium hydroxide by weight of the solution, and wherein the ratio of coating solution to rice hulls is about 1 ml. solution per 1 gram of hulls.

4. The process of claim 1 wherein the coated hulls are heated at a temperature of from about 900° C. to 1500° C. for a period of from about 2 seconds to 10 minutes.

5. A process for densifying rice hulls to obtain a dense alkali metal silicate, which comprises
- coating raw rice hulls with an aqueous solution of sodium hydroxide having a concentration of about 10% sodium hydroxide by weight of the solution, wherein the ratio of coating solution to hulls is about 1 ml. of solution per 1 gram of hulls;
- heating the coated hulls in an air atmosphere at a temperature of at least 1500° C. for a period of at least 2 seconds to thereby incinerate and densify said hulls; and
- recovering an alkali metal silicate composition having a bulk density of from about 1.5 to 2.7 grams/cc.

References Cited

UNITED STATES PATENTS

| | | | |
|---|---|---|---|
| 1,293,008 | 2/1919 | Blardone | 23—110 |
| 2,292,199 | 8/1942 | Carter | 106—74 XR |
| 2,644,742 | 7/1953 | Danison | 23—110 |

FOREIGN PATENTS

| | | |
|---|---|---|
| 969,538 | 9/1964 | Great Britain. |

OTHER REFERENCES

"Soluble Silicates," vol. 1: Chemistry, pp. 17 and 257, James G. Vail, 1952 edition, Reinhold Publishing Corp., New York.

EDWARD STERN, Primary Examiner